United States Patent [19]

Peiffert et al.

[11] 4,207,462

[45] Jun. 10, 1980

[54] LINE-TRACE READ-OUT METHOD AND DEVICE FOR THE SERVO-CONTROL OF MACHINE TOOLS

[76] Inventors: Jean Peiffert, 42 Allee de Persepolis, Orsay, Essonne; Roger S. Barbedienne, 11, rue de Neuville, Erangy sur Oise, both of France

[21] Appl. No.: 926,995

[22] Filed: Jul. 21, 1978

[30] Foreign Application Priority Data

Jul. 22, 1977 [FR]  France .............................. 77 22641

[51] Int. Cl.$^2$ ............................................. G05B 1/00
[52] U.S. Cl. ...................................... 250/202; 318/577
[58] Field of Search .............. 250/202, 234, 235, 236, 250/556; 318/577

[56] References Cited

U.S. PATENT DOCUMENTS 3,398,283  8/1968  Diprose .............................. 250/202

Primary Examiner—David C. Nelms
Assistant Examiner—Darwin R. Hostetter
Attorney, Agent, or Firm—Karl W. Flocks

[57] ABSTRACT

The line-trace to be read-out is illuminated by a light spot scanning radially from, and by rotation around, a center that it set near the line-trace to be read, the radial scan having its own scan frequency and the scan turning around the center at a specific frequency of rotation. A signal is formed corresponding to the contrast modulation between the line-trace and the surrounding background, which is processed to give a signal corresponding to the minimum distance between the scan sweep center and the line-trace, the latter signal being processed further to produce the co-ordinates needed for directing the servo-control means of a machine tool.

8 Claims, 6 Drawing Figures

LINE-TRACE READ-OUT METHOD AND DEVICE FOR THE SERVO-CONTROL OF MACHINE TOOLS

The present invention relates to a method of line-trace read-out as well as a device for carrying out the method with a view to commanding the operation of apparatus such as, for example, an oxygen-fueled cutting torch or a welding machine, by detecting and following a line traced on a background and applying appropriate servo-control equipment.

In the servo-control of such apparatus, methods and means for detecting and following a line-trace, functioning in either a dynamic or a static mode, are already known. In the dynamic mode a light ray is moved over a closed path that cuts the line-trace and is collected by an electric photo-cell that sends its signals to servo-control means commanding the operation of the machine in question. In the static mode the line-trace is illuminated and scanned by a group of photodiodes that are fixed with respect to each other, the signals obtained being treated in an appropriate manner for achieving the same servo-control.

These methods and the means for carrying them out lead to equipment requiring delicate adjustment. In particular this equipment cannot be adjusted to modify independently single given parameters such as velocity, servo lock-on sensitivity and over-run correction or correction of the distance between the read-out axis and the axis of the welding or cutting slot, these parameters being indissociable from one another. Moreover, this equipment is never capable of maintaining high precision at all speeds of machine function under control from a reference line-trace.

It is the main object of the present invention to overcome the drawbacks of these prior art systems by providing a method and means for detecting and following a line-trace for operating servo-control means, unaffected by external disturbances and allowing the aforementioned parameters to be adjusted independently of one another, thus achieving a much higher precision than heretofore possible in the read-out and reproduction of sharp angles at high speed.

According to the invention the line-trace is illuminated by a light spot scanning radially from, and by rotation around, a centre that is set near the line-trace to be read, the radial scan having its own scan frequency and the scan turning around the centre at a specific frequency of rotation. A signal is formed corresponding to the contrast modulation between the line-trace and the surrounding background, which is processed to give a signal corresponding to the minimum distance between the scan sweep centre and the line-trace, the latter signal being processed further to produce the co-ordinates needed for directing the servo-control means.

According to a further feature of the invention the frequency of scan rotation is established by means of two voltages varying sinusoidally and dephased by an angle of $\pi/2$, these voltages being used as reference signals during signal processing.

The signal processing comprises determining a point of inversion of potential polarity at the above-mentioned minimum centre-to-trace distance, determining and memorising the data for a vector of value corresponding to this minimum distance as well as for an orthogonal vector corresponding to the direction of movement, and converting these two vectors separately into corresponding cartesian co-ordinate values. To this end, the potential representing the length of the minimum distance vector is compared with a reference potential representing a selected distance from the scan sweep centre and the result of the comparison is distributed between the two cartesian axes of reference on multiplying the value obtained by a selected factor of vectorial distribution. This vectorial factor, also applied to the voltage values representing velocity and direction furnishes by this means the corrections necessary to maintain a constant proportionality between the minimum distance observed and the selected distance chosen during movement of the read-out head along the line-trace.

In order to carry out this method, the invented means include a read-off head equipped with rotary scan signal generators and a cell for detecting light intensity variation at the instant that the spot reaches the line-trace. This head is connected to a first sampler (a scan potential sampler), a circuit for integrating mathematically the value of the first sampler output signal, the integrated output being applied to a flip-flop whose own output is fed to a second sampler (a minimum potential memory state sampler) and, in parallel, to third and fourth samplers (samplers of the amplitudes of the signals corresponding to the two sinusoidally varying rotation voltages dephased by $\pi/2$) which are themselves connected into two multipliers of these respective values by the signal from a reference potential comparison with the said minimum potential.

The outputs of the third and fourth samplers are also connected to a circuit for adjusting the two components (dephased by $\pi/2$) of the velocity vector by means of an inversion and change of sign.

Other features and advantages of the present invention will be developed and rendered more apparent in the following detailed description of its principles aided by drawings in which.

Figure 1:
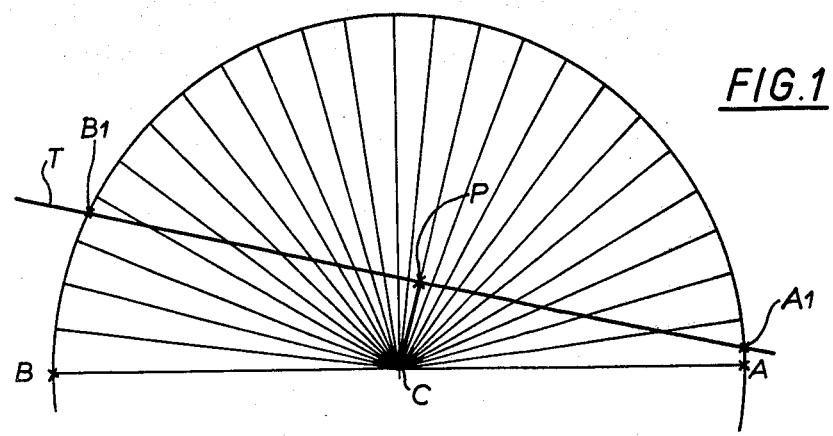
FIG. 1 illustrates the radial scanning scheme with respect to a line-trace.

Referring now to FIG. 1, a line-trace T is read-out with respect to a scan sweep centre C, the frequency of rotation or sweep frequency around the circle of diametre A-B being of the order of 200 Hz.

The minimum distance from the sweep centre C to the line-trace T is defined as being the perpendicular to T from C, that is to say the line CP. It is mathematically obvious that all other lines drawn from C to T, meeting T at a point on either side of P, will be longer than the line CP. Their lengths will diminish as they go from B1, on the circumference of the sweep circle, to P and will then increase as they go from P to A1, again on the circumference of the sweep circle, B1 and A1 being the points of intersection of line-trace T and the sweep circle circumference. The same proportionality applies to the values of the potentials of signals representing their lengths.

Taking into account a scan sweep frequency of, for instance, 200 Hz, a signal is formed at this frequency which varies in amplitude and the maxima and minima of this signal are detected and measured.

Figure 2:
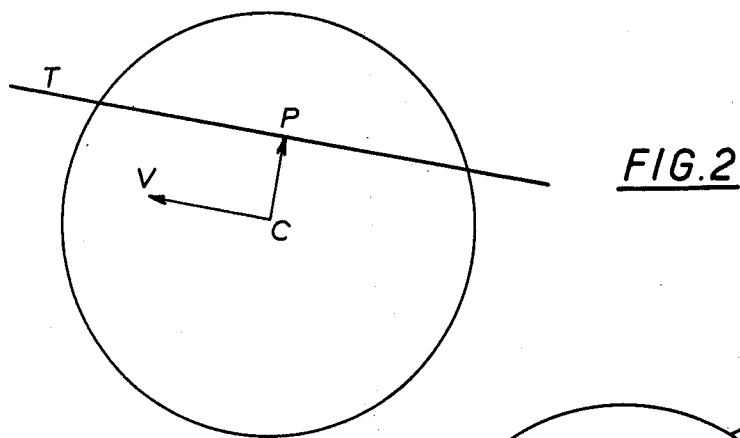
FIG. 2 shows the two vectors as formed during processing of the signal from the read-out head.

Referring now to FIG. 2, the first phase of signal processing gives the distance vector $\overrightarrow{CP}$ and the perpendicular velocity vector $\overrightarrow{CV}$. It is these two vectors that are subjected to further processing in accordance with the invention.

Figure 3:
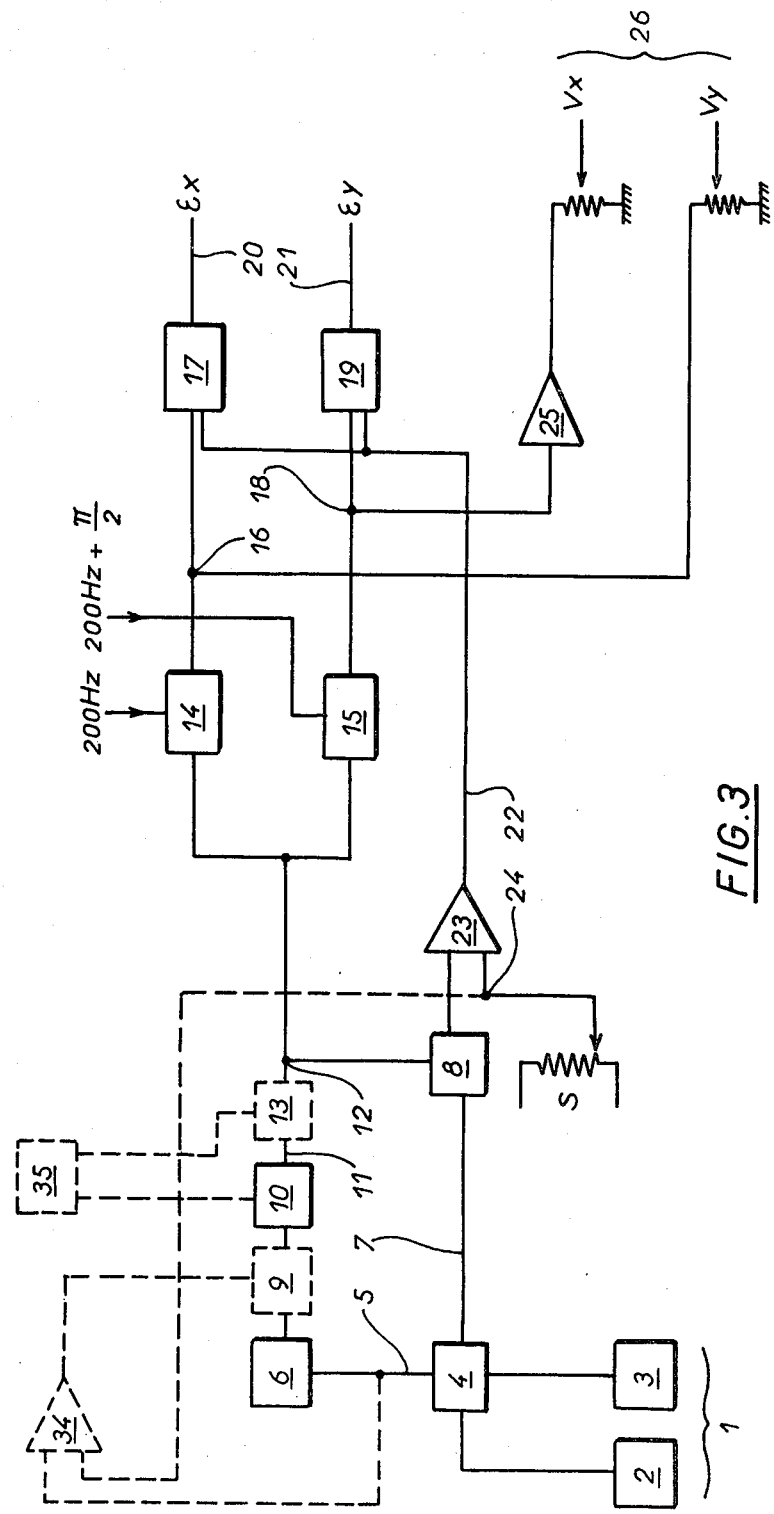
FIG. 3 is a simplified synoptic diagram of the full signal processing circuit.

Turning now to FIG. 3, the signal processing circuit of the invention comprises a read-out head 1 having a radial sweep control and associated circuitry including a generator of radial scan and sweep signals, 2, and a cell 3 for detecting light intensity variation at the instant that the light spot cuts the line-trace. The read-out head output enters a first sampler 4 of the sweep voltage controlled by the pulse from the cell. A first outlet 5 from sampler 4 leads to a circuit of mathematical differentiation, 6, that differentiates the value of the signal for detecting distance optima and measures the minimum distance involved.

A second outlet 7 from sampler 4 is fed to a second sampler 8 of the memory state for the minimum potential detected.

The output from differentiating circuit 6 is sent, by means of a first gating circuit 9 shown in dotted lines and the function of which will be explained further on, to a flip-flop 10. A first outlet 11 from flip-flop 10 is linked to a junction point 12 through a second gating circuit 13 also shown in dotted lines and to be explained further on. The first output from flip-flop 10 when it reaches junction point 12 is then channeled to both the second sampler 8 and to a junction of a third sampler 14 with a fourth sampler 15. The outlet of sampler 14 is connected to a junction point 16 leading to a first inlet to a first multiplier 17, junction point 16 also leading to a first potentiometer Vy. Similarly, the outlet of sampler 15 is connected to a junction point 18 leading to a first inlet to a second multiplier 19, the respective outputs 20 and 21 of the two multipliers being the correction signals Ex and Ey sent to the servo-control means for the apparatus involved (not shown).

The second inlets to multipliers 17 and 19 are connected in common, by 22, to the outlet of a comparison circuit 23 of which one inlet (24) is connected to an adjustable reference voltage source S.

The junction point 18 at the outlet of sampler 15 connects to a second potentiometer Vx via an inverter of polarity 25, potentiometers Vx and Vy being preferably embodied by a double potentiometer (26).

Sampler 8 memorises a potential representing the minimum distance, and this is compared with the selected potential S representing a set distance and which corresponds, for example, to a function of the desired scan sweep radius for use with a specific type of oxygen-fueled cutting torch. The difference resulting from the comparison by circuit 23 is distributed between the X-axis and the Y-axis of vectorial reference by the multipliers 17 and 19 that furnish the products of this difference multiplied by the factor of vectorial distribution previously mentioned.

The factor of vectorial distribution for $\pi/2$ is obtained by an application of the mathematical conversion of the type $\sin(x+\pi/2)$ to $\cos(X+\pi/2)$.

Figure 4:
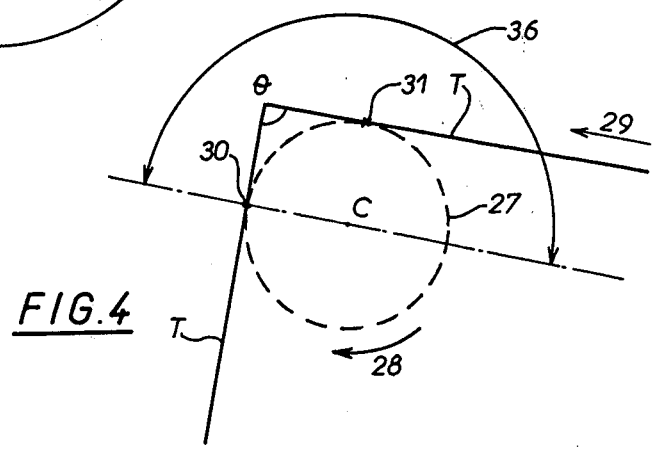
FIGS. 4 to 6 illustrate the diagrams applicable to the read-out and reproduction of a line-trace having a sharp angle.
Figure 5:
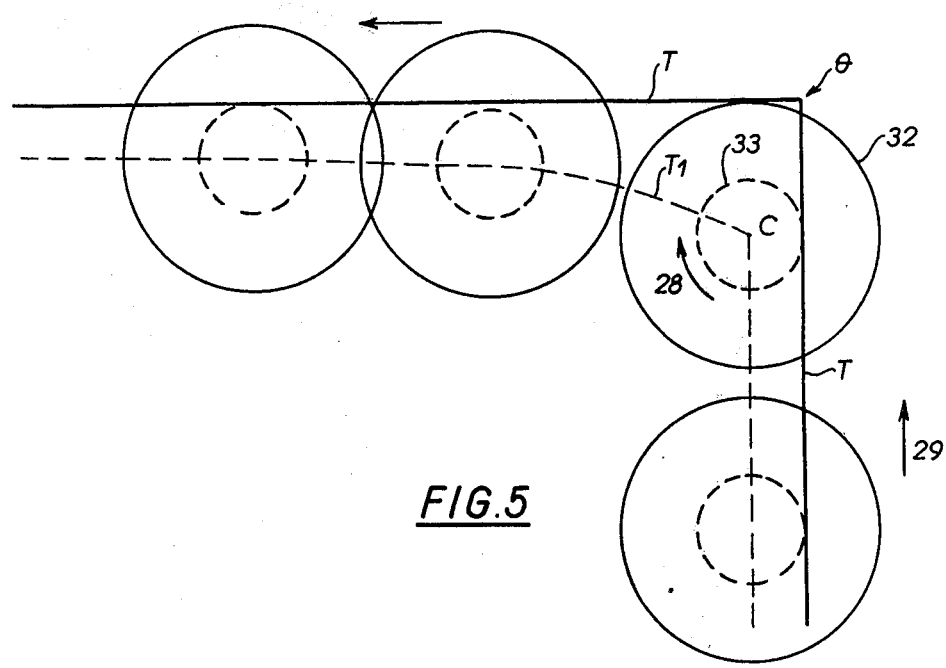
Figure 6:
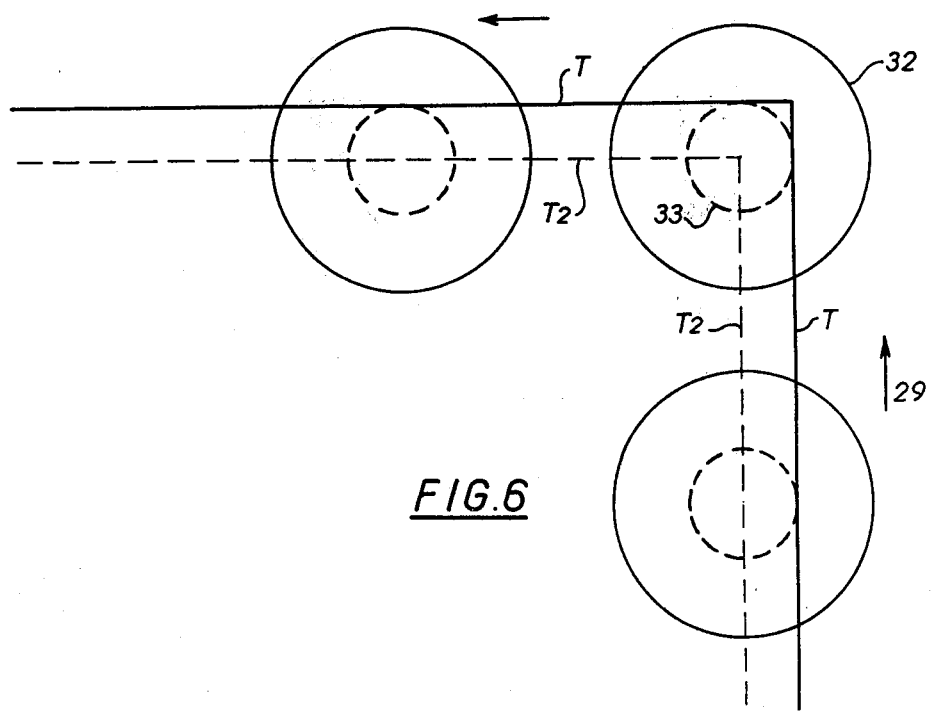

Turning now to FIGS. 4 to 6, there is generally a problem with line-trace read-out equipment in following a line-trace having an angle, such as the line-trace T in FIG. 4 having an angle $\theta$. In FIG. 4 the scan sweep 27 is shown sweeping in the direction of arrow 28 about sweep centre C with the read-out head moving towards the apex of angle $\theta$ in the direction of arrow 29. On approaching this apex the head will reach a position where it detects point 30 on one side of the apex and point 31 on the other side.

In the absence of an appropriate means of correction, and referring now to FIG. 5, the progressive read-out of these two points would cause the head to indicate changes in direction of a dog-leg nature, as illustrated by the dotted line T1, without following precisely the trajectory of line T with its angle $\theta$.

According to the present invention and referring to FIGS. 5 and 6, this problem is overcome by changing from a given scan sweep radius 32 to a very much smaller scan sweep radius 33. For an average oxy-cutting machine, for instance, these scan sweeps can vary between a circle of about 6 mm down to one of about 0.5 mm. The scan sweep radius is a function of the potential at S that is selected, and it is limited electronically to the desired value set by the positioning of S. By this means trajectories of a dog-leg nature such as T1 are avoided and close conformity to the trajectory indicated, as at T2, is obtained.

To do so, and referring again to FIG. 3, the circuitry of the invention comprises a comparison circuit 34 with its inlets respectively fed by the sampler 4 and the voltage from S (as connected at 24), and its outlet leading to gating circuit 9. This comparison circuit 34 prevents signals whose amplitudes represent distances greater than that set by S from triggering flip-flop 10. Moreover, in certain line-trace configurations, and especially those with acute angles, two lines may be detected simultaneously and that which is the new direction of the line being followed up must be chosen on a priority basis for further following. That is to say that the line detected the earliest as a function of the direction of sweep rotation used must be selected.

To this end a counter 35 is provided, advanced by the sweep frequency, and is connected to the flip-flop 10 and to the gating circuit 13. The counter 35 is triggered by the flip-flop pulse and inhibits gating circuit 13 for one-half of a complete scan sweep (see half-circle 36 and circle 27 in FIG. 4) so that the latest signal to arrive as a function of the direction of sweep rotation (31 in FIG. 4) is always suppressed by the effect of the earliest signal (30 in FIG. 4).

It will be noted that each of the circuit components mentioned in the foregoing description is well-known per se and readily available on the market and that the calculation of all component values and accessory electrical circuitry is well within the normal skill of a man of the art in designing a practical embodiment of the electronic circuitry taught by the present invention and coming within the scope of the appended claims.

We claim:

1. A method of line-trace read-out with a view to commanding the operation of a machine through appropriate servo-control means by processing a signal from a photo-electric cell, comprising the steps of illuminating a line-trace by a light spot scanning radially from, and by rotation around, a centre that is set near the line-trace to be read, the radial scan having its own scan frequency and said scan turning around said centre at a specific frequency of rotation, receiving a first signal from the modulation of the contrast between the line-trace and the surrounding background, forming a second signal corresponding to the minimum distance between the scan sweep centre and the line-trace, and processing said second signal to produce the co-ordinates needed for directing said servo-control means.

2. A method according to claim 1, in which the frequency of scan rotation is established by means of two voltages varying sinusoidally and dephased by an angle of $\pi/2$, these voltages being used as reference signals during signal processing.

3. A method according to claim 1, in which said signal processing comprises the steps of determining a point of inversion of potential polarity at said minimum centre-to-trace distance, determining and memorising the data for a vector of value corresponding to said minimum distance as well as for an orthogonal vector corresponding to the direction of movement, converting these two vectors separately into corresponding cartesian coordinate values, comparing the length of said minimum distance vector with a reference potential representing a selected distance from the scan sweep centre, and distributing the result of the comparison between the two cartesian axes of reference on multiplying the value obtained by a selected vectorial unit factor with a distribution dephasing of $\pi/2$ and applied to the velocity and which is obtained on multiplying its two components by a voltage value representing the velocity.

4. A device for carrying out the method according to claim 1, comprising a read-out head equipped with rotary scan signal generators and a cell for detecting light intensity variation at the instant that the spot reaches the line-trace, said head being connected to a first sampler of the scan potential, a circuit for integrating mathematically the value of the output signal from said first sampler, the integrated output being applied to a flip-flop, the output of which is fed to a second sampler which memorises the minimum potential and, in parallel, to third and fourth samplers of the amplitude of the signals corresponding to the two sinusoidally varying rotation voltages dephased by $\pi/2$, which are themselves connected to two multipliers of these respective values by the signal from a comparison member of a reference potential and said minimum potential.

5. A device according to claim 4, in which the outputs of the third and fourth samplers are also connected to a circuit for adjusting the two components dephased by $\pi/2$ of the velocity vector by means of an inversion and change of sign.

6. A device according to claim 4, further comprising a circuit for limitation of the scan circle including a comparison member the inputs of which are respectively connected to the first sampler and to the reference potential and the output is connected to a gate in turn connected between the output of the integration circuit and the flip-flop.

7. A device according to claim 4, further comprising a circuit for suppressing a read-out point on a priority basis in view of the direction of the sweep rotation, and connected on the one hand to the flip-flop and, on the other hand, to a gating circuit in turn connected between said flip-flop and the circuitry associated with said second and fourth samplers.

8. An oxygen-fueled cutting machine comprising a device according to claim 4.

* * * * *